United States Patent [19]

McCarty et al.

[11] Patent Number: 4,675,053
[45] Date of Patent: Jun. 23, 1987

[54] RECORD CLEANING APPARATUS AND METHOD

[76] Inventors: Steven McCarty, 9301 SW. 168 St., Miami, Fla. 33157; Ralph Perrini, 11530 Griffin Blvd., #5, Biscayne Park, Fla. 33161

[21] Appl. No.: 686,534

[22] Filed: Dec. 26, 1984

[51] Int. Cl.$^4$ .............................................. B08B 5/00
[52] U.S. Cl. .................................. 134/21; 134/22.11; 134/22.12; 15/104.8; 15/302; 369/74
[58] Field of Search ................... 134/6, 21, 33, 22.11, 134/22.12; 15/104.8, 302, DIG. 14; 369/74

[56] References Cited

U.S. PATENT DOCUMENTS

| | | | |
|---|---|---|---|
| 2,288,242 | 6/1942 | Huenlich | 15/38 |
| 3,290,045 | 12/1966 | Moore et al. | 369/74 |
| 3,836,329 | 10/1974 | Jordan | 134/21 |
| 3,853,621 | 12/1974 | Sollerud | 134/6 |
| 3,928,068 | 12/1975 | Holm | 134/6 |
| 4,023,677 | 5/1977 | Wittner et al. | 15/114 |
| 4,066,807 | 1/1978 | Craig | 134/6 |
| 4,202,071 | 5/1980 | Scharpf | 15/302 |
| 4,244,587 | 1/1981 | Schweizer | 15/114 |

*Primary Examiner*—Andrew H. Metz
*Assistant Examiner*—Sharon T. Cohen
*Attorney, Agent, or Firm*—Malin, Haley & McHale

[57] ABSTRACT

A cleaning and scrubbing apparatus is described which consists of a vacuum head to which is coupled small hollow fibers. Each of the fibers has a diameter of approximately the size of the record groove so that it may fit within the record groove to scrub away debris formed within the groove. A cleaning fluid is be placed over the record to partially dissolve the debris so that the fibers can loosen it as the record is rotated across the fibers. The vacuum causes the cleaning fluid including the debris to be sucked through the hollow opening of the fibers. The side walls of the fibers may be a membrane material so that additional fluid flows through the side walls. In order to clean the cleaning head, the fluid is forced in the reverse direction while the head and fibers are facing upright, thereby washing away the debris which has become affixed to the fibers.

12 Claims, 5 Drawing Figures

RECORD CLEANING APPARATUS AND METHOD

This invention relates to an apparatus and method for cleaning records and more particularly an apparatus and method for causing small fibers to fit within the grooves of the record and to scrub away the debris and remove the debris and cleaning fluid previously placed on the record.

The care and cleaning of phonorecords has long been a major problem for the average consumer or the professional collector. This is particularly true of old records which have been collecting dirt and grit for many years. The problem in cleaning records has always been loosening and removing the debris from between the grooves. Many techniques have existed in which fibers of a brush are applied over the top of the record. However, the fibers of the brush have always been approximately the same size as the grooves or even larger. Thus, the edge of the fiber cannot penetrate into the groove to loosen and remove the dirt and other debris which has settled within the groove. Even where small fibers were used, no means existed in the prior art to remove the loosened debris.

It is particularly the debris within the grooves that causes the loss of fidelity of the record. A good clean record should provide better high and upper mid-range tones as well as have fewer ticks, pops and will last a substantially longer time. However, the longer the debris remains in the grooves the more it becomes packed and hence the greater the degradation it causes. Furthermore, the longer the debris remains in the grooves the more difficult it is to loosen.

There is known in the prior art a number of cleaning fluids which can be used in conjunction with cleaning phono records. Many of these fluids are designed to chemically loosen the debris. However and particuarly for old records, the fluids only partially work. It is still necessary to completely loosen debris to provide some means to actually scrub it out. Another problem with using the cleaning fluids is even to the extent that the debris is loosened, no effective means exist to remove it. Many of the debris particles are so small that as the fluid is wiped away from the phono record's surface, the tiny particles of debris cling to the bottom or sides of the groove. Vacuum means have been tried in the past to remove the fluid, but the vacuum head had to be held away from the record surface to avoid damage. Because of this limitation on usage, the prior art vacuum devices were unable to remove the fluid and debris from within the grooves. It would be preferable to provide some means to remove by vacuum or otherwise the minute particles of debris located within the grooves.

The prior art consists of many different types of phono record cleaners which include both brushes and/or the use of cleaning fluids and vacuum means to remove the fluid. For instance, reference is made to U.S. Pat. No. 4,244,587 to Schwizer entitled "Apparatus for Cleaning Records"; U.S. Pat. No. 4,202,071 to Scharpf entitled "Apparatus for Washing and Drying Phonograph Records". In addition reference is also made to the Nitty Gritty Models 1.0 through 3.5 and VPIHW 16 record cleaners described in the November 1984 issue of AUDIO MAGAZINE. Other prior art machines include the HW-16 machine by VIP Industries, Inc. and Mark 3 by Keith Monk, Inc. In none of these prior art references, however, do the brush fibers extend into the groove of the phonorecord to completely remove the debris particles.

BRIEF DESCRIPTION OF THE INVENTION

In accordance with one aspect of this invention there is provided a grooved disk cleaning apparatus comprising a cleaning head having a plurality of hollow tubes extending therefrom, where each tube is of a size not greater than substantially the peak to peak separation between adjacent grooves of the disk. In addition the apparatus includes vacuum means for providing a fluid flow into the end of each tube as the ends of the tube remote from the head is in close proximity to the disk and relative movement occurs between the disk and the tubes.

One preferred embodiment of the subject invention is hereafter described in detail with specific reference being made to the following Figures:

DESCRIPTION OF A PREFERRED EMBODIMENT

Figure 1:
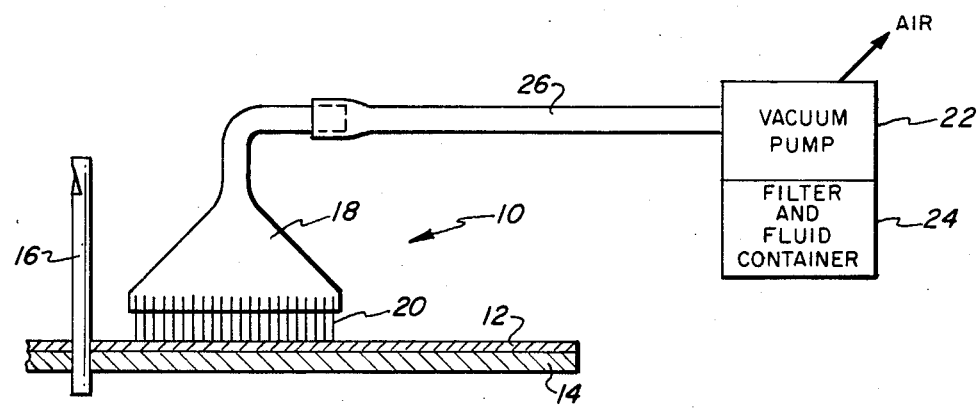
FIG. 1 shows the record cleaning apparatus of the subject invention.

Referring now to FIG. 1, the record cleaning apparatus 10 is shown and includes a record 12 positioned on a turntable 14 through a spindle 16. The cleaning head 18 is placed over the grooves of the record so that hollow tubes, or fibers 20, extend down from head 18 and into the grooves of record 12. The length of fibers 20 below head 18 is between one-fourth and one-half of an inch. A vacuum pump 22 having a filter and fluid container section 24 is coupled through vacuum hose 26 to cleaning head 18. Connected in this manner a suction is created through fibers 20 to vacuum any cleaning fluid placed over record 12.

Figure 2:
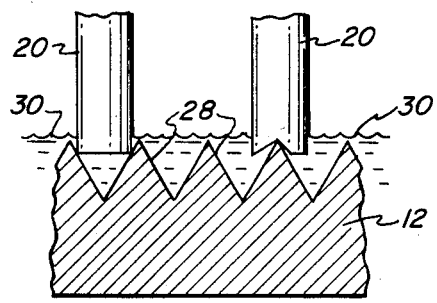
FIG. 2 shows a more detailed view of the tubes contacting the record grooves.
Figure 3:
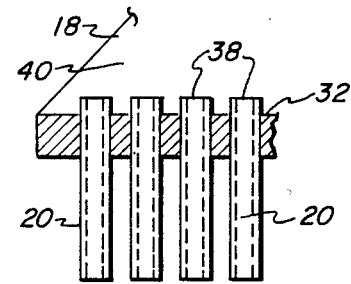
FIG. 3 shows a more detailed view of the tubes being affixed into the cleaning head.
Figure 4:
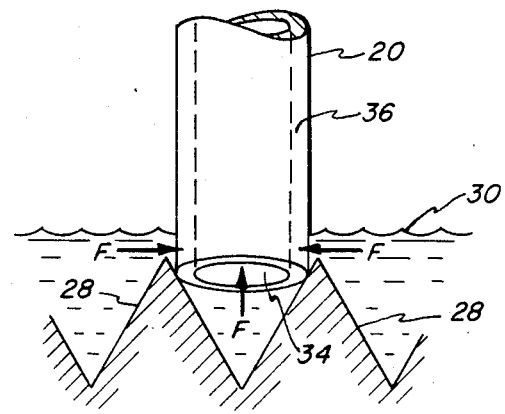
FIG. 4 shows the manner in which a single tube operates within a record groove.

Referring now to FIGS. 2, 3 and 4 the construction of head 18 and operation thereof will now be described. From FIG. 2, it is seen that each of the fibers 20 is extremely small in size. More specifically each of the fibers 20 is approximately the same size of any of the grooves 28 of record 12. Examples of such hollow fibers 20 are those used in Hemodialysis systems such as the CF12-11 System manufactured and sold by Travenol Laboratories, Inc. of Deerfield, Ill. Both head 18 and fibers 20 may, in fact, be either the upper or lower portion of the Hemodialysis device with the fibers being cut to, for instance, one third of an inch from the end cap. More specifically fibers 20 are approximately ten microns in diameter and have a hollow center. The material of which the walls of fibers 20 are made may be cuprophane formed to be a membrane so that fluid can flow both into the bottom opening of fibers 20 and through the walls thereof when the vacuum from pump 22 is applied.

Referring to FIG. 3, fibers 20 are connected into head 18 by polyurethane material 32 which holds a bundle of fibers 20 slightly separated from one another in a fixed position. The top 38 of the fibers should be within head 18 which is a partially evacuated chamber 40 when pump 22 operates.

Referring now to FIG. 4, a detailed view of fiber 20 is shown. Fiber 20 includes the hollow opening 34 and fiber wall 36 which may be cuprophane formed to be a membrane. Thus, as vacuum is provided in chamber 40 to ends 38 of fibers 20, the fluid 30 flows both into opening 34 and through walls 36, as indicated by the arrows F. As fluid is flowing into opening 34 of fiber 20, the debris particles attached to groove 28 flow through head 18, pipe 26, pump 22 and are trapped by the filter in container 24. As record 12 is rotated with fibers 20 positioned in the grooves 28, the contact between fiber 20 and the side of the grooves loosens much of the debris which may be partially loosened by the fluid 30. It should be noted, while only a one dimensional view of the fibers 20 are shown in the Figures, head 18 has a depth perspective (not shown) so that a large number of fibers are actually present. These fibers form at various places within the groove and will both scrub the groove clean of minute debris particles as well as attract them out of the groove.

In order to avoid damaging the record, it is necessary that the fibers 20 be as soft as possible. The cuprophane membrane material, when wet, is a sufficiently soft material so that no appreciable damage occurs to the records. However, when a sufficient number of fibers 20 are used, back to back along the direction of movement of the record, sufficient scrubbing action still occurs despite the softness of each individual fiber.

Figure 5:
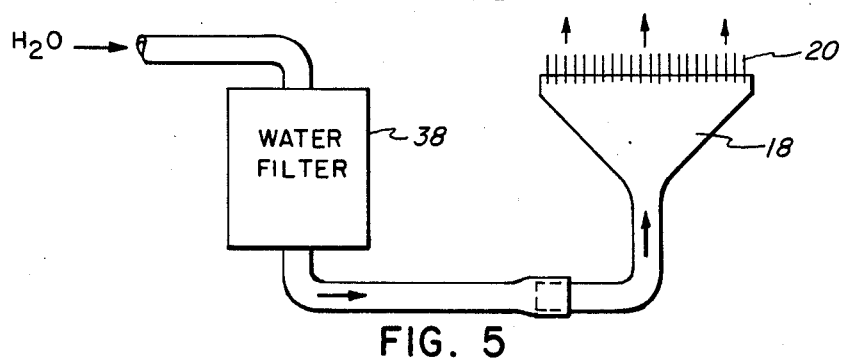
FIG. 5 shows the manner in which the head may be cleaned.

Referring now to FIG. 5, after head 18 is used to clean a record 12, it in turn must be cleaned for use in future cleaning operations. In order to clean head 18 filtered water is provided in the opposite direction through head 18 and fibers 20 to purge the debris collected on the sides of each of the fibers 20. Water is passed through the fibers until they are clean. This may be done a number of times. Ordinary tap water for instance may be applied through a conventional charcoal filter 38 to be used as the purging cleaning fluid. In the cleaning operation, the fibers 20 should be pointed in an upward direcion so that as the water flows through fibers 20 is trickles down the sides thereof causing the debris to be washed off the sides. This same procedure may also be used to wet, and hence soften, the fibers 20 prior to each initial use of head 18 to clean a record 12.

What is claimed is:

1. A grooved disk cleaning apparatus for cleaning grooves from a position below adjacent peaks of said grooves comprising:

a cleaning head having a plurality of hollow tube means extending therefrom, each of said hollow tubes means having distal end means having a cross sectional width smaller than a peak to peak separation between adjacent grooves of said disk, said distal end means sized for placement in the groove below the adjacent peaks of the groove of said disk, and vacuum means for providing a fluid flow from the grooves into said distal end means remote from said head of each said hollow tube means as said distal end means is in the groove below the adjacent peaks of the groove of said disk, and a turntable means for providing relative movement between said disk and tubes to allow said distal end means to scrub the groove below the adjacent peaks.

2. The invention according to claim 1:

wherein said vacuum means including a vacuum pump for drawing fluid into said distal end means.

3. The invention according to claim 2 wherein said hollow tube means have membrane type walls.

4. The invention according to claim 3 wherein said hollow tube means are a soft cuprophane material.

5. The invention according to claim 1 wherein said hollow tube means is a cuprophane material.

6. The invention according to claim 1 further comprising means to clean said head including providing a filtered liquid through said tubes in a direction away from said head.

7. A grooved disk cleaning apparatus comprising:

a cleaning head having a plurality of hollow tubes extending therefrom;

each tube being of a size not greater than substantially the peak to peak separation between adjacent groove of said disk; and vacuum means for providing fluid flow into the end remote from said head of each tube as said remote end is in close proximity to said disk, and turntable means for providing relative movement between said disk and tubes;

said tubes having walls which act as membranes;

whereby said fluid flows through said membrane wall and whereby said tubes scrubb said disk.

8. A method of cleaning grooved disks comprising the steps of:

saturating the grooves with a fluid;

applying a cleaning head against said grooves, said head including a plurality of narrow hollow tubes, each of said tubes being so arranged on said head to function to scrub the interior of said grooves, each of said tubes having an end having a diameter sized to allow said tubes to engage the interior of the grooves below the adjacent peaks of the grooves of said disk;

scrubbing said grooves with said tubes;

applying a vacuum to the end of said tubes remote from said disk; and rotating said disk while said tubes are applied against the interior of the grooves during vacuuming.

9. The method according to claim 8 further comprising; the step of cleaning debris from said head after said head is applied against said grooves.

10. The method according to claim 9 wherein; said step of cleaning includes applying a fluid through said tubes in a direction towards said head and into the grooves of said disk.

11. The method according to claim 8 wherein said step of cleaning includes applying a fluid through said hollow tubes having membrane side walls in a direction towards said head to permit fluid flow through each said end through each said walls into the grooves of said disk.

12. The invention according to claim 2 wherein the diameter of the tubes is approximately 10 microns.

* * * * *